United States Patent
Hatfield

(10) Patent No.: US 6,182,428 B1
(45) Date of Patent: Feb. 6, 2001

(54) FENCE LINE MOWER

(76) Inventor: Charles S. Hatfield, 8282 Hwy. 112 South, Bentonville, AR (US) 72712

(*) Notice: Under 35 U.S.C. 154(b), the term of this patent shall be extended for 0 days.

(21) Appl. No.: 09/292,739

(22) Filed: Apr. 16, 1999

(51) Int. Cl.[7] ................................................. A01D 55/00
(52) U.S. Cl. ...................................... 56/12.7; 56/10.4
(58) Field of Search ................................. 56/6, 12.7, 13.6, 56/17.1, 255, 295, 10.4, DIG. 10; 30/347, 276, 380

(56) References Cited

U.S. PATENT DOCUMENTS

| | | | |
|---|---|---|---|
| 2,583,897 | 1/1952 | Smeds | 97/137 |
| 3,003,299 | 10/1961 | Smith et al. | 56/25.4 |
| 3,444,674 | 5/1969 | Huff et al. | 56/25.4 |
| 3,665,685 | 5/1972 | Allard | 56/10.4 |
| 3,715,872 | 2/1973 | Thompson, Jr. | 56/10.4 |
| 4,077,191 | 3/1978 | Pittinger, Sr. et al. | 56/12.7 |
| 4,182,100 | 1/1980 | Letter | 56/16.9 |
| 4,189,901 | 2/1980 | Poettgen | 56/10.4 |
| 4,267,686 | * 5/1981 | Heath | 56/52.7 |
| 5,023,998 | * 6/1991 | Masciarella et al. | 30/276 |
| 5,035,107 | 7/1991 | Scarborough | 56/10.6 |
| 5,048,276 | 9/1991 | Miller | 56/16.9 |
| 5,065,566 | * 11/1991 | Gates | 56/12.7 |
| 5,167,108 | * 12/1992 | Bird | 56/13.7 |
| 5,226,284 | 7/1993 | Meehleder | 56/11.6 |
| 5,303,532 | 4/1994 | Phillips | 56/12.7 |
| 5,471,824 | * 12/1995 | Neely | 56/12.7 |
| 5,694,752 | * 12/1997 | Warfield, III | 56/13.6 |

* cited by examiner

*Primary Examiner*—Robert E. Pezzuto
(74) *Attorney, Agent, or Firm*—Aquilino, Welsh & Flaxman

(57) ABSTRACT

The mowing apparatus includes a frame supported by a plurality of wheels enabling ready movement of the frame over a support surface and a cutting assembly secured to the frame. The cutting assembly includes a laterally extending housing rotatably supporting a cutting implement and a motor coupled to the cutting implement for rapidly rotating the cutting implement. The cutting assembly is pivotally secured to the frame for movement about a first axis and a second axis substantially perpendicular to the first axis.

12 Claims, 6 Drawing Sheets

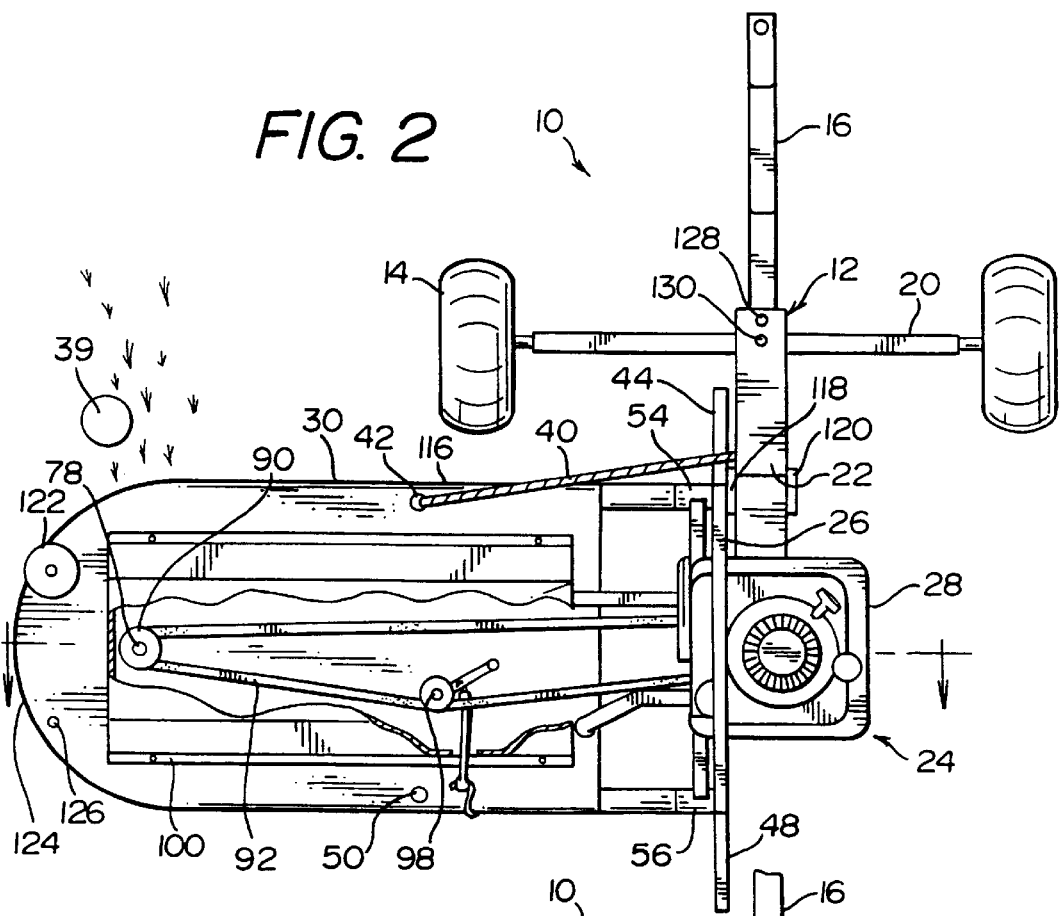
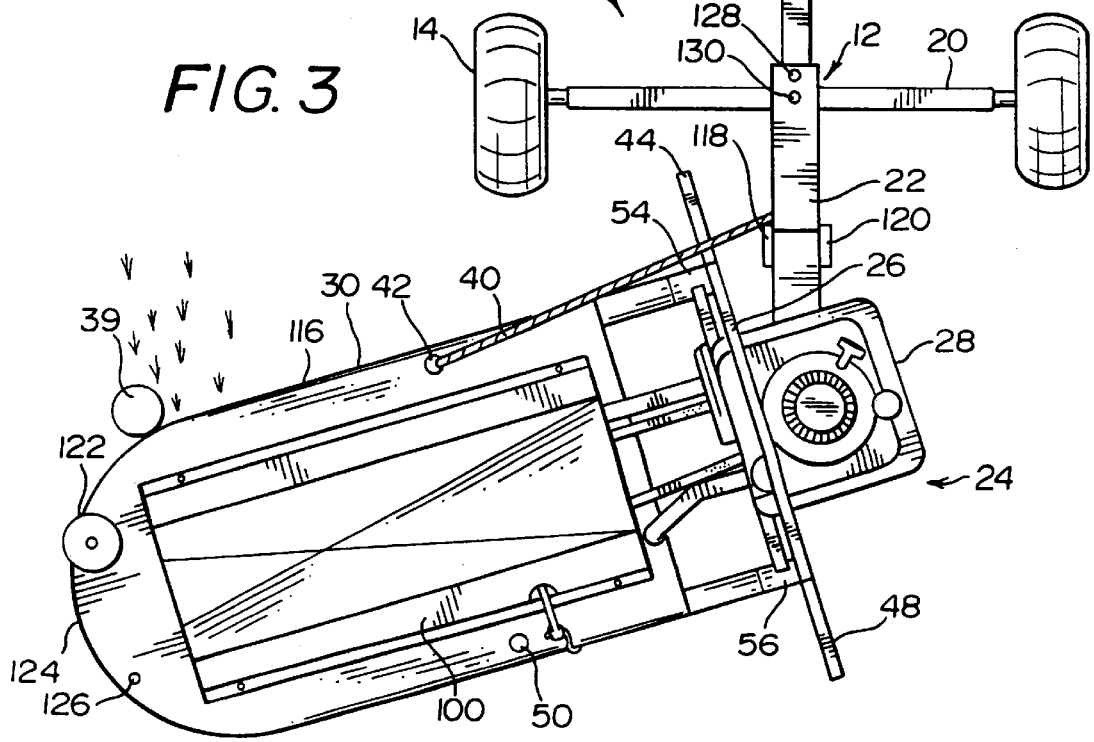

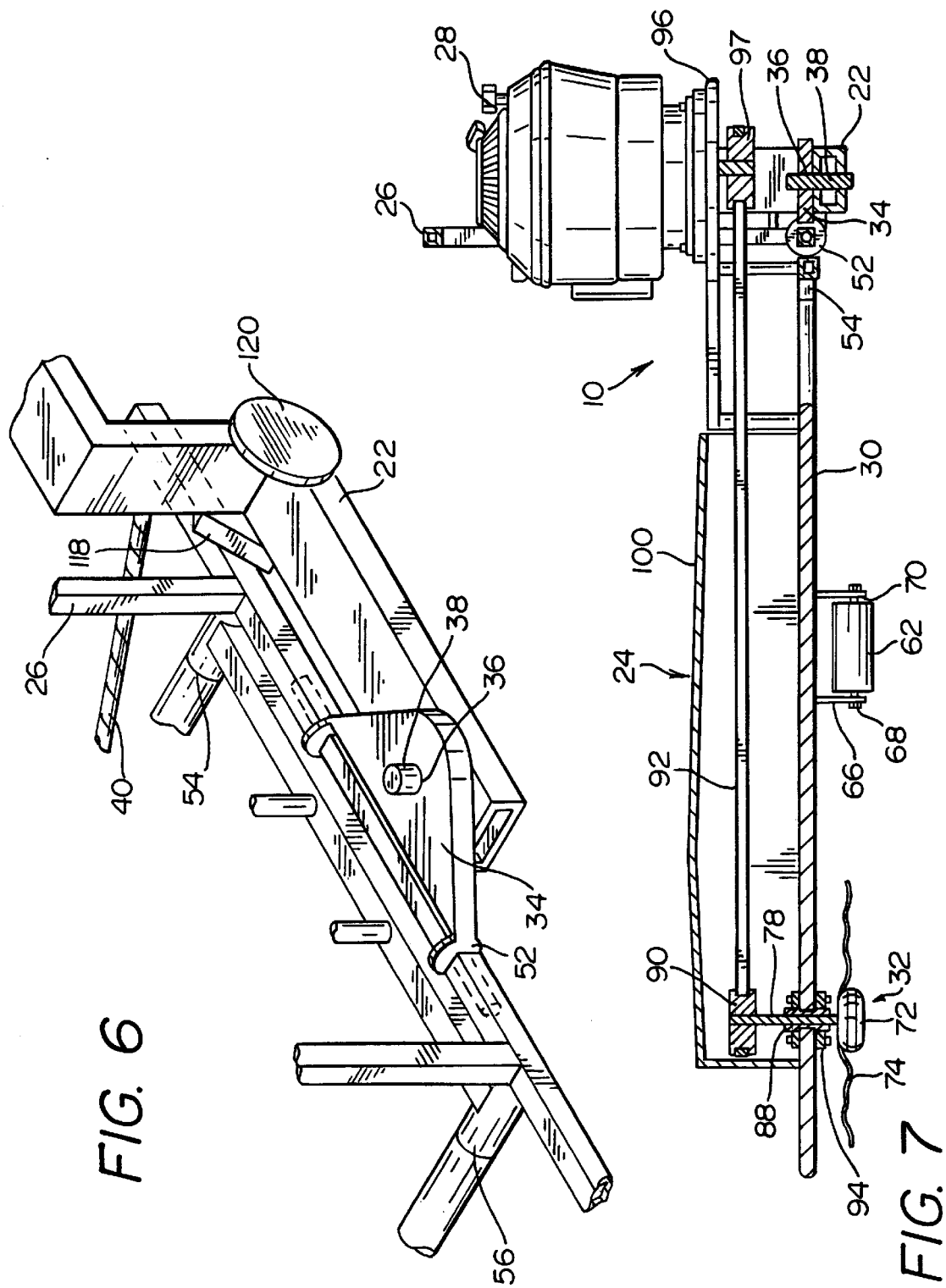

FENCE LINE MOWER

BACKGROUND OF THE INVENTION

1. Field of the Invention

The invention relates to a device for mowing and/or trimming grass and weeds away from the base of a fence or around the foundation of a building (or exterior wall). More particularly, the invention relates to a string line fence mowers adapted for movement about stationary objects in the path of the mower.

2. Description of the Prior Art

As anyone who has ever cut a lawn will attest, trimmming around trees, fences and other obstacles is one of the most time consuming tasks associated with properly cutting a lawn. With this in mind, a wide variety of trimming apparatuses have been developed for trimming about trees, fences and other obstacles.

Probably the most common device currently employed is a line trimmer. Line trimmers are highly effective, but generally require that an individual carry the trimmer as he or she moves about the obstacle. While this is not a major problem when one attempts to trim small to moderate sized yards, it becomes very time consuming when traditional string trimmers are used to trim a large lot.

A need, therefore, exists for a mowing and/or trimming device which may be moved about a lot to trim around obstacles by a motorized vehicle.

SUMMARY OF THE INVENTION

It is, therefore, an object of the present invention to provide a mowing apparatus. The mowing apparatus includes a frame supported by a plurality of wheels enabling ready movement of the frame over a support surface. The apparatus further includes a cutting assembly secured to the frame, wherein the cutting assembly includes a laterally extending housing rotatably supporting a cutting implement and a motor coupled to the cutting implement for rapidly rotating the cutting implement. The cutting assembly is pivotally secured to the frame for movement about a first axis and a second axis substantially perpendicular to the first axis.

It is also an object of the present invention to provide a mowing apparatus wherein the cutting implement includes a freely rotating support member which supports a string line adapted for mowing. The rotating member includes a first loop, a second loop and a hook about which the string line is wrapped to conveniently secure the string line to the support member.

It is another object of the present invention to provide a mowing apparatus wherein the support member also includes first and second stabilizers for maintaining tension in the string line.

It is a further object of the present invention to provide a mowing apparatus wherein the cutting assembly further includes an end roller positioned at a far end of the laterally extending housing to protect the housing as the mowing apparatus moves past various objects.

It is also an object of the present invention to provide a mowing apparatus wherein the cutting assembly is adapted to be mounted on the frame in a first orientation and a second orientation 180° from the first orientation.

It is another object of the present invention to provide a mowing apparatus wherein the cutting assembly further includes a support roller coupled to the laterally extending housing for maintaining the cutting implement off the ground.

It is a further object of the present invention to provide a mowing apparatus wherein the support roller is adjustably coupled to the cutting assembly.

It is also an object of the present invention to provide a mowing apparatus wherein a mounting bracket adjustably couples the support roller to the cutting assembly, and the mounting bracket includes a plurality of aligned openings in which the roller is selectively positioned.

It is another object of the present invention to provide a mowing apparatus including means for limiting pivotal movement about the first axis.

It is a further object of the present invention to provide a mowing apparatus wherein the means for limiting includes a line coupled between the cutting assembly and the frame for limiting movement about the first axis.

It is also an object of the present invention to provide a mowing apparatus wherein the means for limiting includes a projecting arm limiting movement about the first axis.

It is another object of the present invention to provide a mowing apparatus including a frame supported by a plurality of wheels enabling ready movement of the frame over a support surface and a cutting assembly including a support roller coupled to the laterally extending housing for maintaining the cutting implement off the ground.

It is a further object of the present invention to provide a mowing apparatus including a frame supporting a cutting implement coupled to a motor which drives the cutting implement. The cutting implement includes a freely rotating support member which supports a string line adapted for mowing. The support member includes a first loop, a second loop and a hook about which the string line is wrapped to conveniently secure the string line to the support member.

It is also an object of the present invention to provide a mowing apparatus wherein the support member also includes first and second stabilizers for maintaining tension in the string line.

It is another object of the present invention to provide a mowing apparatus wherein the first stabilizers is positioned between the first loop and the hook and the second stabilizer is positioned between the second loop and the hook.

It is a further object of the present invention to provide a mowing apparatus wherein the stabilizers are projecting posts about which the string line is wrapped.

It is also an object of the present invention to provide a mowing apparatus wherein the first loop and the second loop are positioned on opposite sides of the support member.

Other objects and advantages of the present invention will become apparent from the following detailed description when viewed in conjunction with the accompanying drawings, which set forth certain embodiments of the invention.

BRIEF DESCRIPTION OF THE DRAWINGS

FIGS. 2 and 3 are top views of the present fence line mower moving about an obstruction, for example, a fence post.

FIG. 6 is a detailed perspective view of pivoting assembly.

FIG. 7 is a cross sectional view along the line VII—VII in FIG. 2.

DESCRIPTION OF THE PREFERRED EMBODIMENTS

Figure 1:
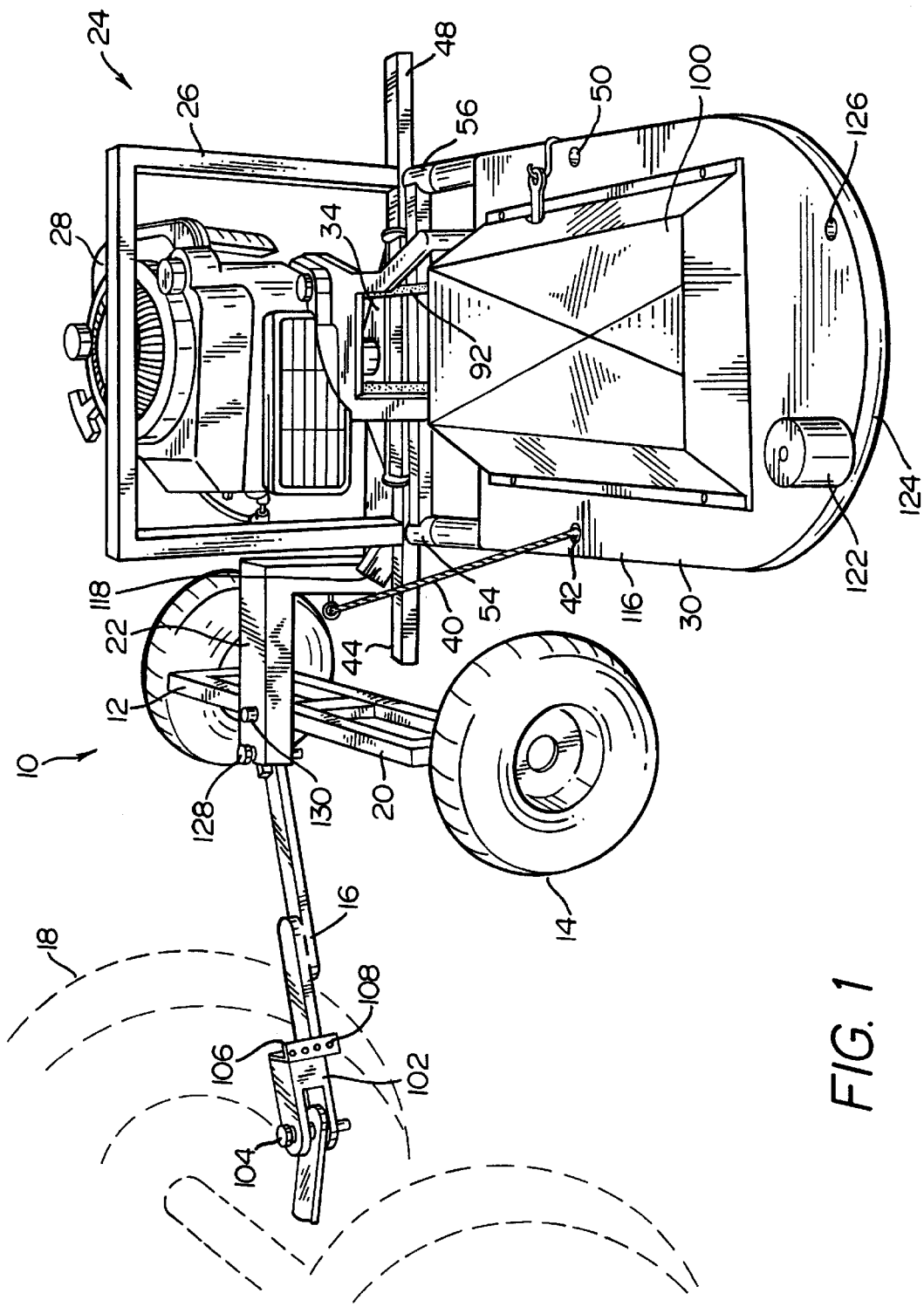
FIG. 1 is a perspective view of the present fence line mower.

The detailed embodiment of the present invention is disclosed herein. It should be understood, however, that the disclosed embodiment is merely exemplary of the invention, which may be embodied in various forms. Therefore, the details disclosed herein are not to be interpreted as limited, but merely as the basis for the claims and as a basis for teaching one skilled in the art how to make and/or use the invention.

With reference to FIGS. 1 to 9, a mowing apparatus 10 is disclosed. The mowing apparatus 10 includes a frame 12 supported by two wheels 14. The frame 12 includes a forwardly extending hitch 16 adapted for selective attachment with a tractor 18, or other motorized vehicle, used to pull the mowing apparatus 10. The hitch 16 includes a pivotally mounted tractor bracket 102 which secures the hitch 16 to the tractor 18 via a pivot pin 104. Adjustment of the hitch 16 is facilitated by a connecting member 106 selectively secured to the tractor bracket 102. The connecting member 106 includes a series of aligned holes 108 permitting the connecting member 106 to be secured to the tractor bracket 102 at various desired locations.

The frame 12 further includes a central support structure 20 with wheels 14 on opposite sides thereof and a rearwardly extending support bar 22 upon which the cutting assembly 24 is mounted. The forwardly extending hitch 16 is coupled to the remainder of the frame 12 via a pivot pin 128 and a selectively removable control pin 130, allowing ease of movement between the tractor 18 and the mowing apparatus 10.

Figure 10:
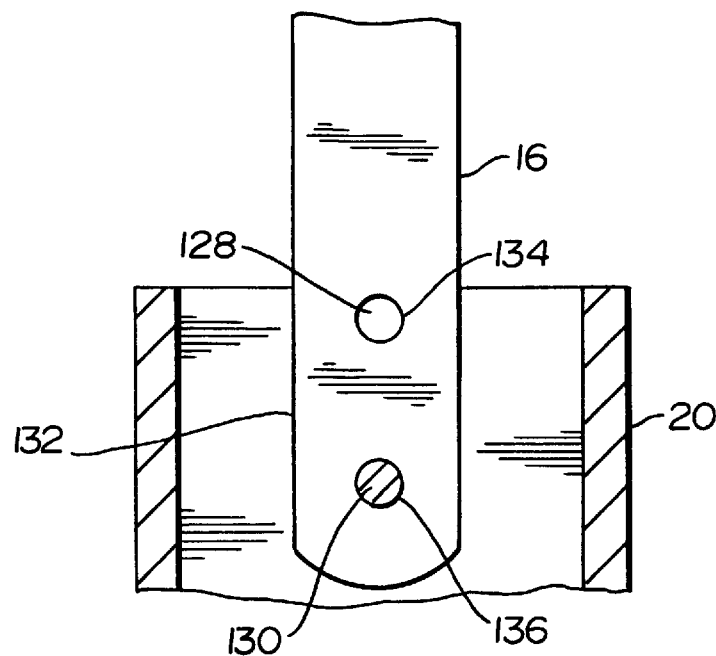
FIGS. 10 and 11 are partial cross sectional views showing the hitch attachment to the support structure.
Figure 11:
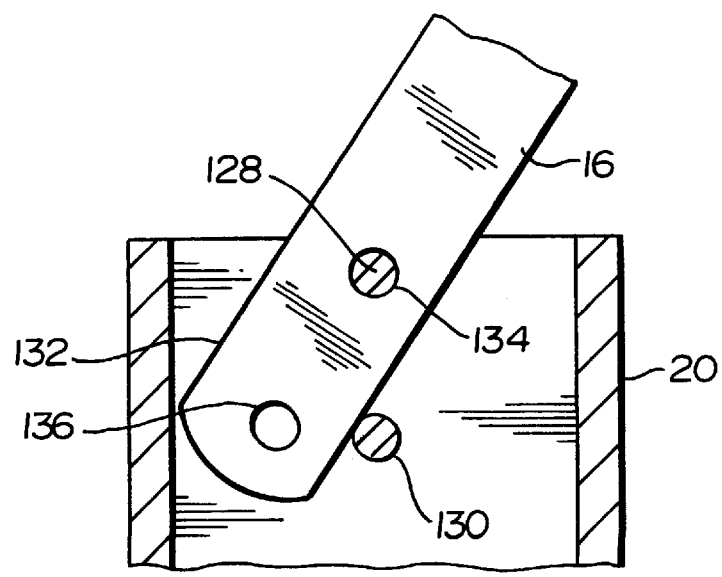

With reference to FIGS. 10 and 11, the tongue 132 of the of the hitch 16 includes first and second holes 134, 136 which are used in conjunction with the pivot pin 128 and the control pin 130 to lock the hitch 16 at a desired orientation relative to the support structure 20. Specifically, the tongue 132 freely pivots on the pivot pin 128 and, depending upon the positioning of the second hole 136 relative to the control pin 130, the tongue is locked in a specific orientation. As respectively shown in FIGS. 10 and 11, the control pin 130 may be placed in the second hole 136 to lock the hitch perpendicular to the support structure 20 or the control pin 130 may be inserted with the tongue offset therefrom to lock the hitch at a predetermined angle relative to the support 20. The ability to angle the hitch 16 in this manner, allows the mowing apparatus 10 to be selectively offset for use with tractors of varying widths.

The cutting assembly 24 is pivotally and selectively secured to the rearwardly extending support bar 22 of the frame 12. Specifically, the cutting assembly 24 is secured to the frame 12 such that the cutting assembly 24 may freely rotate about both a substantially horizontal axis and a substantially vertical axis.

The cutting assembly 24 includes a support framework 26 upon which a motor 28, a cutting housing 30 and a cutting implement 32 are mounted. As briefly discussed above, the support framework 26 is secured to the rearwardly extending support bar 22 of the frame 12 for pivotal movement about two axes. With this in mind, the support framework 26 include a laterally extending flange 34 pivotally coupled to the rearwardly extending support bar 22. The laterally extending flange 34 includes a central opening 36 coupled to a pivot pin 38 extending from the rearwardly extending support bar 22. In this way, the cutting assembly 24 is permitted to rotate about the substantially vertical axis defined by the pivot pin 38. The pivotal connection permits the cutting assembly 24 to pivot about a substantially vertical axis, allowing the cutting assembly 24 to move around obstructions, for example, a fence post 39 (see FIGS. 2 and 3), as it is drawn about a lot.

Movement of the cutting assembly 24 about the vertical axis is limited by the provision of a resilient line 40 mounted between a bolt 42 secured along a lateral side 116 of the cutting assembly 24 and the support bar 22. As will be discussed in greater detail below, the cutting assembly 24 is reversibly mounted on the frame 12 and the cutting assembly 24 is provided with a second bolt 50 for resiliently biasing the cutting assembly 24 when it is rotated 180° and mounted for cutting on the opposite side of the frame 12.

Movement of the cutting assembly 24 is further limited by the first projecting arm 44 extending from the rear of the support framework 26. Specifically, as the cutting assembly 24 is drawn inwardly by the resilient line 40, the first projecting arm 44 contacts a first pad 118 secured to the rearwardly extending support bar 22 to limit rotation of the cutting assembly 24. The second projecting arm 48 limits movement about the vertical axis by contacting a second pad 120 when the cutting assembly 24 is mounted to the opposite side of the frame 12 as discussed in greater detail below.

The laterally extending flange 34 is pivotally coupled to the remainder of the support framework 26 by a hinge 52 oriented along a substantially horizontal axis. The hinge 52 permits the cutting assembly 24 to pivot about the substantially horizontal axis, allowing the cutting assembly 24 to move over obstructions as it is pulled about a lot. Movement of the cutting assembly 24 about the horizontal axis is limited by the weight of the cutting assembly which continually urges the cutting assembly to its substantially horizontal position.

The cutting assembly 24 includes a cutting housing 30 secured to the support framework 26. The cutting housing 30 defines an enclosure under which the cutting implement 32 is mounted for rapid rotation. The cutting housing 30 is laterally offset from the support framework 26 and offsets the cutting implement 32 from the body of the tractor 18 and mowing apparatus 10, such that the cutting implement 32 may readily contact grass and other vegetation as the mowing apparatus 10 is pulled around a lot. The cutting housing 30 is mounted on a pair of parallel support rods 54, 56 extending laterally from the support framework 26.

Figure 4:
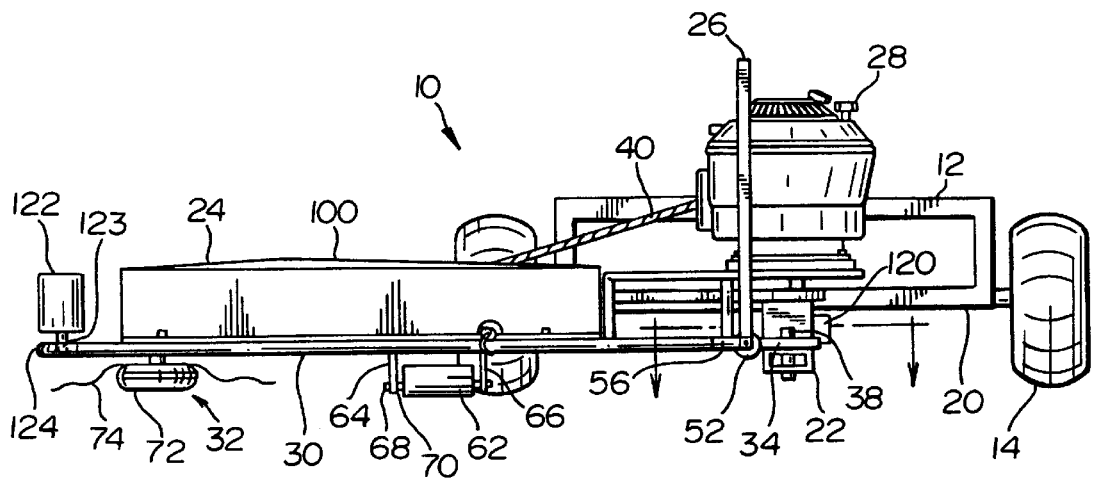
FIGS. 4 and 5 are rear views of the present fence line mower pivoting about a horizontal axis.
Figure 5:
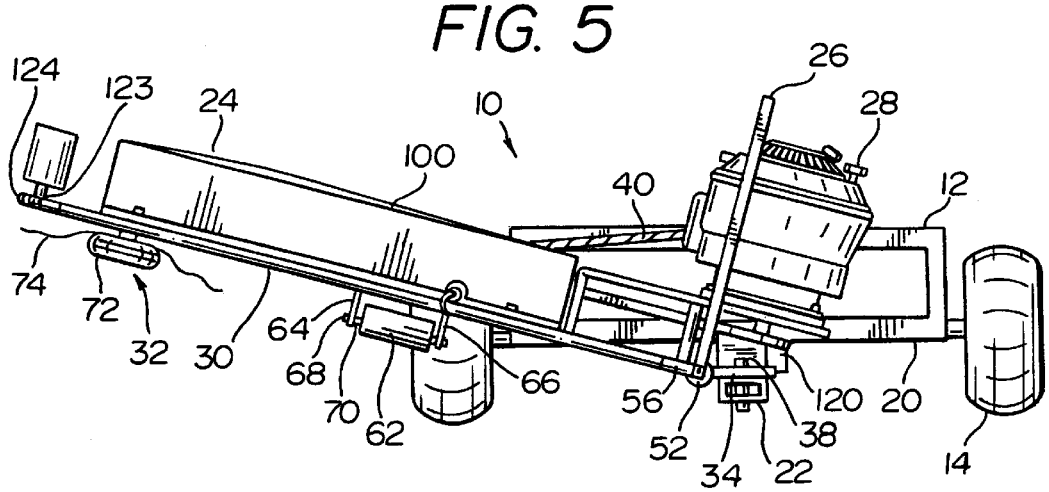

The cutting housing 30 is further provided with a downwardly extending roller 62. As shown in FIGS. 4, 5 and 7, the roller 62 is adjustably mounted to the underside of the cutting housing 30, and may be selectively vertically positioned within aligned openings 64 on the mounting bracket 66 to adjust the position of the roller 62 relative to the cutting housing 30. Specifically, removable caps 68 on the roller axle 70 permit selective removal of the roller 62. The roller 62 is positioned to maintain the mower ball 72 off the ground to eliminate frictional loss. This improves the efficiency of the engine and limits dipping into holes, low spots and soft or wet ground.

The cutting housing 30 is further provided with a end roller 122 secured within a first hole 123 at the far end 124 of the cutting housing 30. The end roller 122 protects the far end 124 of the cutting housing 30 as the present mower moves past various objects, for example, building foundations, fences and exterior walls. The end roller 122 is bolted to the cutting housing 30 such that the end roller 122 rotates as it engages various objects. As discussed above, the cutting assembly 24 is reversibly mounted and the cutting housing 30 is provided with a second hole 126 in which the end roller 122 may be secured when the cutting assembly 24 is mounted in its alternate configuration.

The cutting implement 32 is preferably a string line 74 commonly used with conventional line trimmers. While a string line 74 is used in accordance with the preferred embodiment of the present invention, other comparable cutting implements may be used without departing from the spirit of the present invention.

Figure 8:
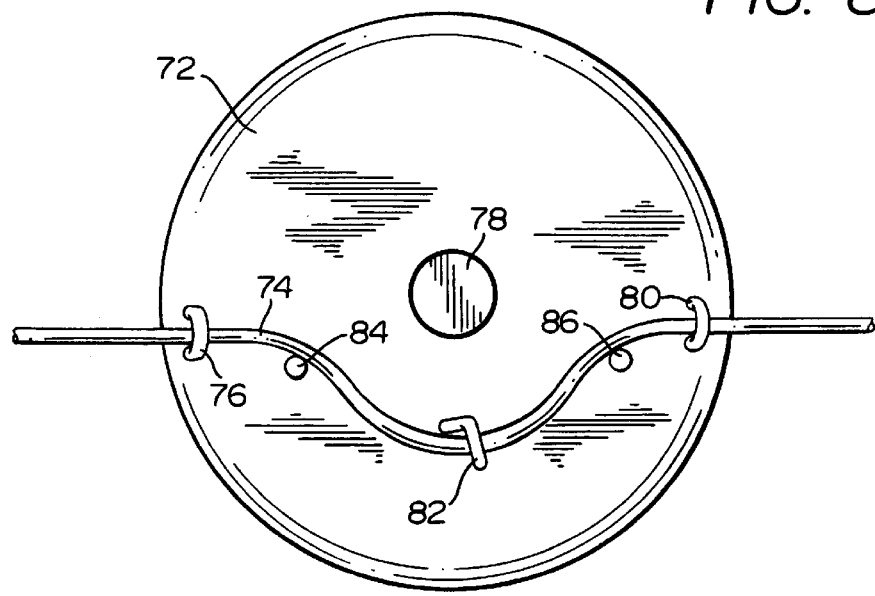
FIG. 8 is a top view of the string line attachment.
Figure 9:
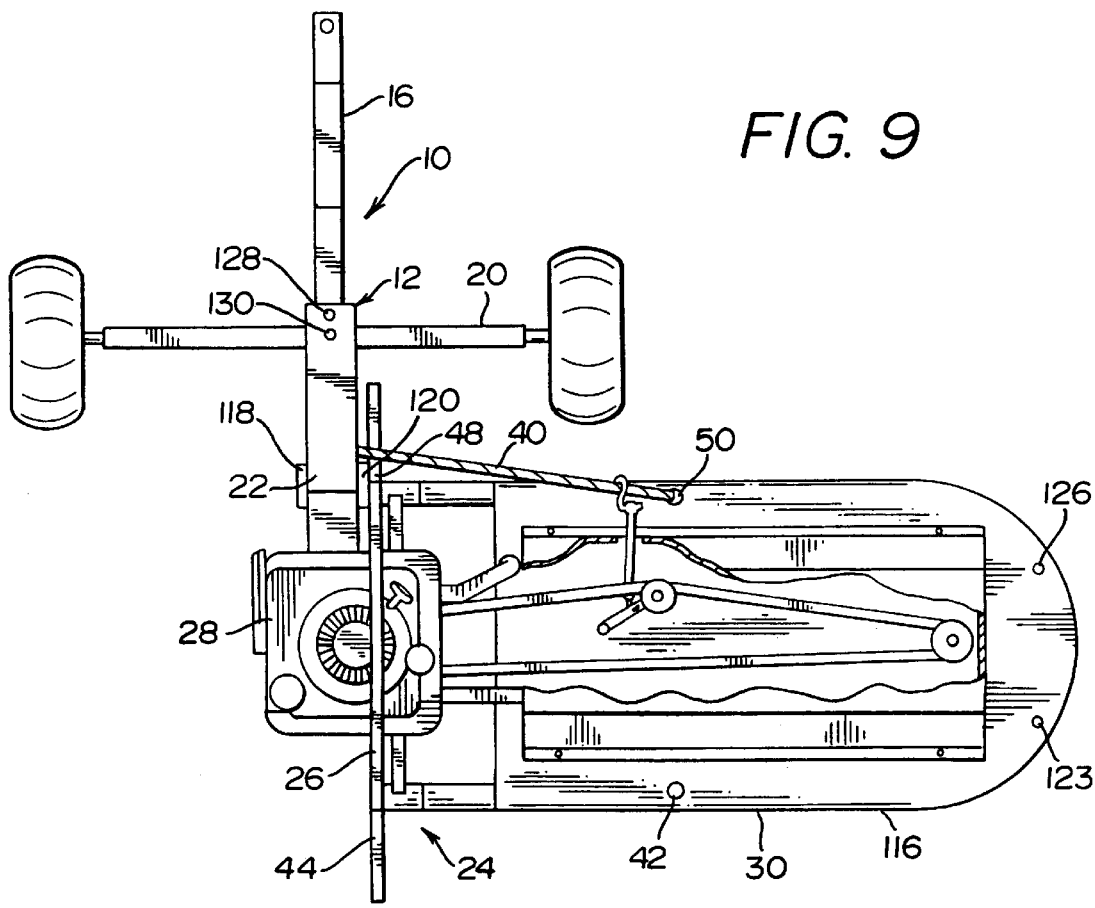
FIG. 9 is a top view showing the cutting assembly mounted on the opposite side.

The string line 74 is connected to a mower ball 72 rotatably secured beneath the cutting housing 30. With reference to FIG. 8, the structure for attaching the string line 74 to the mower ball 72 is disclosed. Specifically, the string line 74 is passed through a first rounded loop 76 recessed from the edge of the mower ball 72 to one side of the shaft 78 extending from the mower ball 72. The string line 74 is then passed through a diametrically opposed second rounded loop 80 on the other side of the mower ball 72. Once the string line 74 has been passed though the first and second rounded loops 76, 80 the string line 74 is then secured to a hook 82 which wedges the string line 74 and holds it in position. The string line 74 is mounted on the hook 82 by passing it over and into the hook 82.

The stability of the string line 74 is further enhanced by the provision of first and second stabilizers 84, 86 respectively positioned between the first and second loops 76, 80 and the hook 82. The positioning of the stabilizers 76, 80 creates tension within the string line 74 which improves the stability of the string line 74 as the mower ball 72 rotates.

This string line assembly provides a simple, convenient and reliable mechanism for attaching the string line 74 to the mower ball 72. In accordance with the preferred embodiment of the present invention, the string line 74 is square and has a cross section of 0.155". However, those skilled in the art will understand that other string lines may be used without departing from the spirit of the present invention.

The mower ball 72 includes an upwardly extending shaft 78 which extends through a hole 88 in the cutting housing 30 such that the motor 28 may be coupled to the mower ball 72 for rotating the string line 74. The upwardly extending shaft 78 is fitted with a pulley 90 about which a drive belt 92 passes for coupling the motor 28 to the string line 74. Rotational movement of the shaft 78 within the cutting housing 30 is enhanced by the provision of a bearing 94 in which the shaft 78 rotates.

A support arm 96 mounts the motor 28 on the opposite side of the support framework 26. This balances the cutting assembly 24 in a desirable manner, although other balancing techniques could be employed without departing from the spirit of the present invention.

As briefly discussed above, a drive belt 92 couples the drive shaft 97 of the motor 28 to the string line 74. A spring loaded tensioning pulley 98 is positioned between the drive shaft 97 and the upwardly extending shaft 78 to ensure transmission of power between the motor 28 and the string line 74. It is contemplated that a stationary pulley (not shown) may be positioned along the drive belt 92 to improve tension of the belt 92. A cover plate 100 substantially covers the drive assembly to protect both the drive assembly and individuals using the present apparatus.

The versatility of the present apparatus is enhanced by permitting the cutting assembly 24 to be selectively positioned on either side of the frame 12. Specifically, the rearwardly extending support bar 22 and the laterally extending flange 34 may be selectively separated, permitting the cutting assembly 24 to be turned around 180° and mounted on the other side of the frame 12 (see FIG. 9). Since both the cutting assembly 22 and the frame 12 are substantially symmetrical, reversing the cutting assembly 24 simply requires the operator to rotate the cutting assembly 24 and remount it on the opposite side of the frame 12.

While the preferred embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A mowing apparatus, comprising:

a frame supported by a plurality of wheels enabling ready movement of the frame over a support surface, the frame including a forwardly extending hitch adapted for selective attachment to a motorized vehicle and a rearwardly extending support bar upon which a cutting assembly is mounted;

the cutting assembly includes a laterally extending housing rotatably supporting a cutting implement and a motor coupled to the cutting implement for rapidly rotating the cutting implement; and a laterally extending flange pivotally which couples the rearwardly extending support bar to the cutting assembly, the laterally extending flange includes a central opening coupled to a pivot pin extending from the rearwardly extending support bar permitting relative rotation of the cutting assembly about a first axis, and the laterally extending flange is further pivotally coupled to the remainder of the rearwardly extending support bar by a hinge oriented along a substantially horizontal axis permitting relative rotation of the cutting assembly about a second axis perpendicular to the first axis, wherein the cutting assembly is pivotally secured to the frame so as to avoid objects in the way of the cutting assembly and rotate to freely follow the contour of the ground over which it is moving.

2. The mowing apparatus according to claim 1, wherein the cutting implement includes a freely rotating support member which supports a string line adapted for mowing, the rotating member including a first loop, a second loop and a hook about which the string line is wrapped to conveniently secure the string line to the support member.

3. The mowing apparatus according to claim 2, wherein the support member also includes first and second stabilizers for maintaining tension in the string line.

4. The mowing apparatus according to claim 1, wherein the cutting assembly further includes an end roller positioned at a far end of the laterally extending housing to protect the housing as the mowing apparatus moves past various objects.

5. The mowing apparatus according to claim 1, wherein the cutting assembly is adapted to be mounted on the frame in a first orientation and a second orientation 180° from the first orientation.

6. The mowing apparatus according to claim 1, wherein the cutting assembly further includes a support roller coupled to the laterally extending housing for maintaining the cutting implement off the ground.

7. The mowing apparatus according to claim 6, wherein the support roller is adjustably coupled to the cutting assembly.

8. The mowing apparatus according to claim 7, wherein a mounting bracket adjustably couples the support roller to the cutting assembly, and the mounting bracket includes a plurality of aligned openings in which the roller is selectively positioned.

9. The mowing apparatus according to claim 1, further including means for limiting pivotal movement about the first axis.

10. The mowing apparatus according to claim 9, wherein the means for limiting includes a line coupled between the cutting assembly and the frame for limiting movement about the first axis.

11. The mowing apparatus according to claim 9, wherein the means for limiting includes a projecting arm limiting movement about the first axis.

12. A mowing apparatus, comprising:

a frame supporting a cutting implement coupled to a motor which drives the cutting implement;

the cutting implement includes a freely rotating support member which supports a string line adapted for mowing; the support member including a first loop recessed from a first edge of the support member, a second loop recessed from a second edge of the support member opposite the first edge and a hook positioned between the first loop and the second loop, and about which the string line is wrapped to conveniently secure the string line to the support member; and a first stabilizer positioned between the first loop and the hook and a second stabilizer positioned between the second loop and the hook, the first and second stabilizers creating tension within the string line to improve the stability of the string line as the support member rotates.

* * * * *